Feb. 6, 1962 R. J. PIERCE ETAL 3,020,397
INTENSITY COMPARING SYSTEM FOR DETERMINING FRACTION
OF TRAVEL TIME TO A RADIATING SOURCE
Filed Oct. 11, 1956 4 Sheets-Sheet 1

INVENTORS
HARDIN T. ABRAMS
ROGER J. PIERCE
By Moody and Goldman
ATTORNEYS

INVENTORS
HARDIN T. ABRAMS
ROGER J. PIERCE
By Moody and Goldman
ATTORNEYS 3,020,397
INTENSITY COMPARING SYSTEM FOR DETERMINING FRACTION OF TRAVEL TIME TO A RADIATING SOURCE
Roger J. Pierce and Hardin T. Abrams, Cedar Rapids, Iowa, assignors to Collins Radio Company, Cedar Rapids, Iowa, a corporation of Iowa
Filed Oct. 11, 1956, Ser. No. 615,734
11 Claims. (Cl. 250—2)

This invention relates to a system that utilizes the received intensity of a signal from a radiation source to determine the time of travel to reach the source by a vehicle moving toward the radiation source at a constant velocity.

The constant-velocity vehicle receives a signal, S, from a radiation source having a constant amplitude, $P_T$. When a square-law detector is used in the reception system of the invention, the distance D and the travel time $t$ between the vehicle and the radiating source varies according to the following expression:

$$S = \frac{K_1 P_T}{D^2} = \frac{K_2 P_T}{t^2} \quad (1)$$

where $K_1$ and $K_2$ are proportionality constants. Expression 1 holds for directly received radiation, where there are no substantial disturbing components, such as high intensity reflections crossing the path of vehicle travel.

However, the invention does not require a square-law detector and may use any type, as long as the exponent of D in Expression 1 is known during the required indications of travel time. This specification will presume for purposes of explanation that a square-law detection system is used.

The invention theoretically can provide a travel-time indication without any error when the radiation source has constant output. However, the invention can be used without substantial theoretical error when the output of the radiation source is varied under certain conditions as long as its average energy level remains substantially constant, such as when it is amplitude-modulated at a rate that is fast relative to the time between a pair of sampling times which are required by the invention, so that the modulation can be filtered.

The invention does not require that the output value of the source radiation be known, as long as the source radiation remains constant.

The invention can indicate the instant when a given amount of travel time exists for a vehicle to reach the source, when travelling at a constant, but unknown, velocity. If the particular constant velocity is known, the invention can indicate the travel distance remaining to the source at a given instant of time.

The invention utilizes the nonlinear change in the detected output of a radiation receiver located in the constant-velocity vehicle. In this case, the detected signal continually changes by an increasing amount according to Expression 1 above, as the vehicle moves nearer to the radiation source.

If the signal is sampled at two instances $t_a$ and $t_b$, Expression 1 may be used to provide the following ratio:

$$\frac{S_a}{S_b} = \left(\frac{t_b}{t_a}\right)^2 \quad (2)$$

where $S_a$ and $S_b$ are the received signal amplitudes occurring at instantaneous times $t_a$ and $t_b$, respectively.

The invention makes a first sample, $S_a$, of the received signal at a time, $t_a$, which may be arbitrarily selected. The invention then continuously samples the received signal until it senses an amplitude value that has a predetermined ratio with respect to the amplitude of the first sample. The invention indicates when the given signal ratio is obtained, which is given by Expression 2 above as ratio $t_b/t_a$, and which represents the fraction of travel time that the vehicle has travelled since initial time $t_a$. The remaining travel time or any portion of it can then be computed.

The invention includes a radiation receiver, an initial switching means, a voltage divider, a memory device, an amplitude comparator, and a computer, in combination. The initial switching means provides a first input to the computer at an initial time $t_a$, which can, within certain limitations, be arbitrary. A transient is provided to the computer by operation of the initial switching means at the instant of time $t_a$. The initial switching means also simultaneously disconnects the memory device from the output of the radiation receiver, so that the memory device remembers the signal output level of the radiation receiver at instant $t_a$.

The voltage divider is also connected serially to the output of the radiation receiving means, and it is tapped to provide a voltage which is a known fraction of the output voltage of the radiation receiving means.

The amplitude comparator has one input connected to the memory means and has another input connected across the tapped portion of the voltage divider. When the voltage divider input becomes equal to the memory device input, the comparator provides a second transient output for the system. During the time between the two transients, the tapped voltage-divider signal rises from amplitude $S_a$ to a second amplitude $S_b$. At the time of the second transient, the signal ratio $S_b/S_a$ equals the preset resistance ratio of the voltage divider. Thus with the signal ratio known at time $t_b$, the time ratio is also known because of Expression 2 and is equal to the square root of the signal ratio. At time $t_b$, the time ratio represents the fraction of the travel time to the radiation source that has elapsed since initial time $t_a$. The computer uses the transients at instances $t_a$ and $t_b$ and their ratio to compute and indicate the occurrence of any further time in the journey of the vehicle.

The computer can accordingly provide an output transient to indicate exactly when the source is reached. Or, on the other hand, the computer can indicate a given travel time before the source is reached. For example, it could provide an indication at one-quarter second from the source. In the case of a missile, a one-quarter second indication might detonate a warhead.

Due to practical limitations which limit the stability of components to something below perfection, the perfect indication theoretically obtainable from the invention will generally have a small error. For example, some types of memory devices, such as capacitors, which are perhaps the most simple, can accurately remember a voltage for only a limited period of time. It is necessary in the invention for the memory device to accurately remember a voltage from time $t_a$ to beyond time $t_b$. Consequently, it is desirable to space times $t_a$ and $t_b$ sufficiently close to be within the limitations of the memory device. Furthermore, the computer may also have memory devices with equal limitations. Thus, it is sometimes necessary to select time $t_a$ when the remaining travel time is relatively short. Furthermore, practical limitation of the comparator may require substantial input amplitudes, which may not be obtainable when the travel time is exceedingly long.

Consequently in some cases, the initial switching means, which operates at initial time $t_a$, should include some means for roughly indicating when the travel time is relatively short. For example, a 100 percent or more error in a time indication used to select time $t_a$ could easily be tolerated in most cases.

Thus, in some cases where the radiation power is roughly known, the initial switching means may be operated by another amplitude comparator, which monitors the received signal amplitude against a fixed-preselected D.C. voltage level and provides an output actuation that operates the initial switching means when the received signal exceeds a minimum value of signal level. However, such a coarse-position indication is to some extent dependent upon the power provided from the source, which may not be known at all.

Where the total travel time is roughly known, a preset time-operated switch could be used to actuate the initial switching means so that actuation occurs at an instant that is relatively close to the radiation source.

A third type of means for operating the initial switching means, which is less fallible than the above-mentioned means for providing coarse initial operation is a coarse-time indicator that also operates by means of the received signal and that is capable of simple construction. A type of coarse-time indicator which can be used in the invention is described and claimed in patent application Serial Number 606,947 of Thomas C. Stephens, filed August 27, 1956. A basic difference, however, between this type of coarse-time indicator and the present invention is that the former theoretically provides some error in its time indication; while, on the other hand, the invention provides a theoretically errorless time indication.

Further objects, features and advantages of this invention will be apparent to a person skilled in the art upon further study of the specification and drawings, in which.

Figure 4:
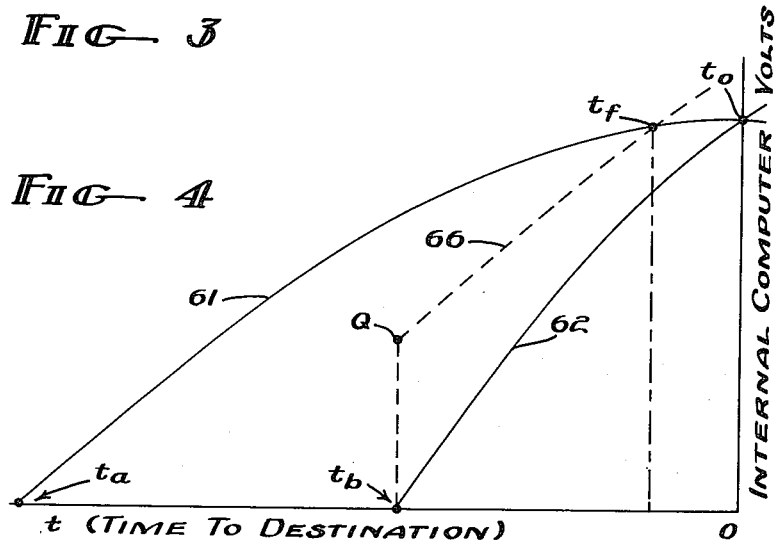
Figure 5:
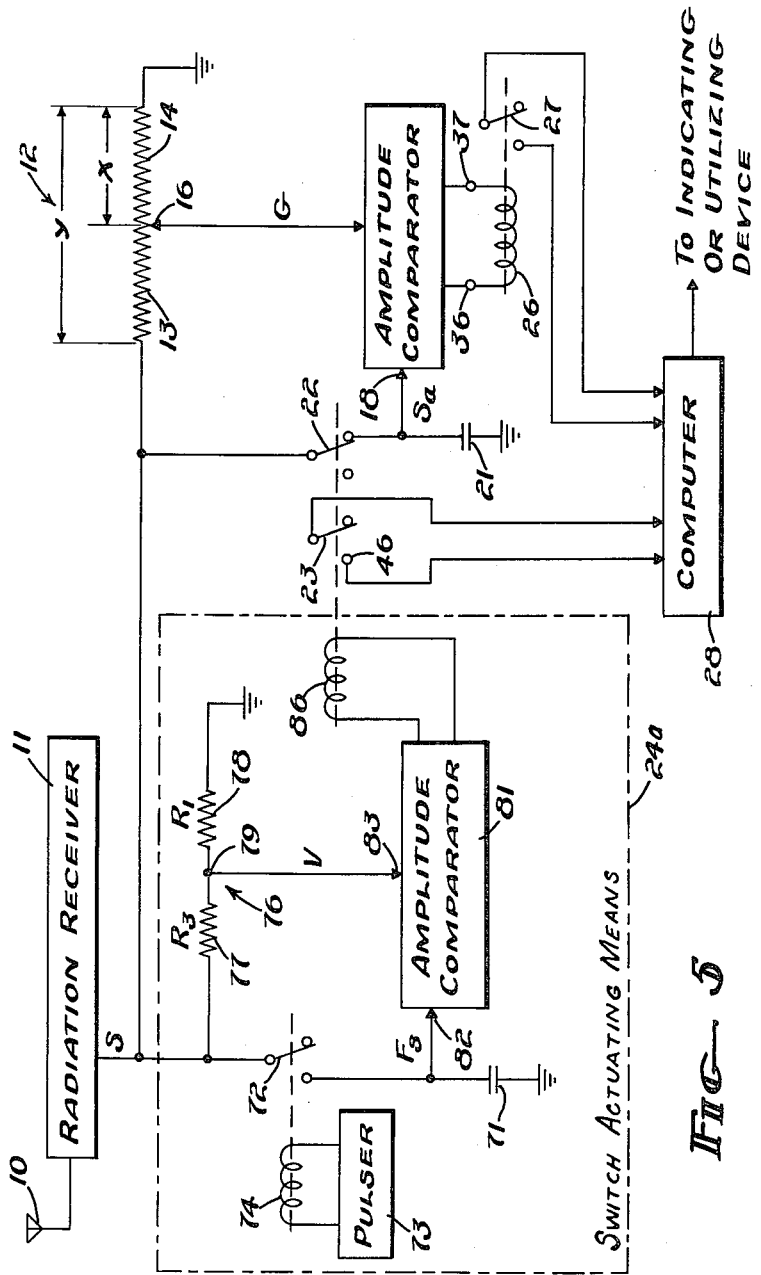
Figure 6:
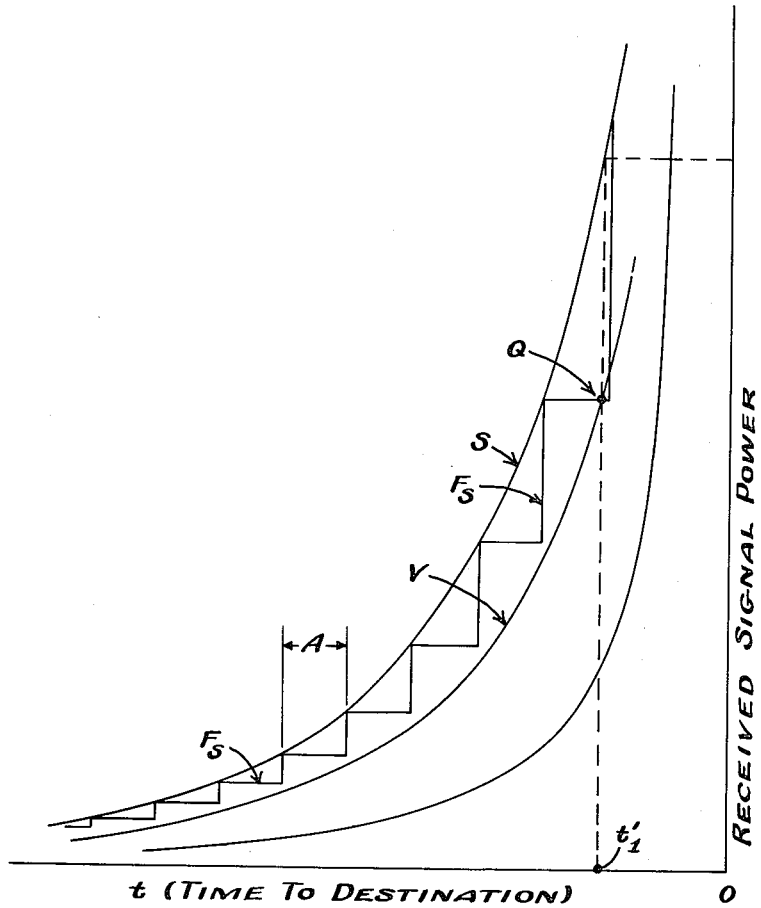

FIGURE 4 provides curves used in explaining the operation of a computer that can be utilized by the invention;

FIGURE 5 illustrates a more detailed form of the invention; and,

FIGURE 6 is a diagram illustrating the operation of a special type of initial actuating means used in FIGURE 4.

Figure 1:
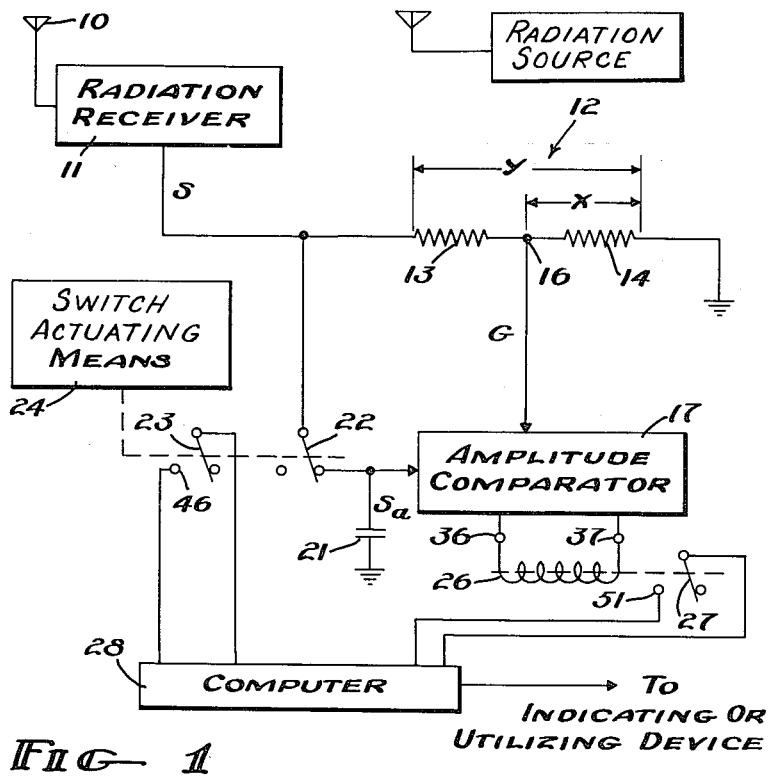
FIGURE 1 illustrates one form of the invention.

Now referring to the invention in more detail, FIGURE 1 illustrates a general form of the invention, which might be supported on a vehicle. The invention includes an antenna 10, which senses radiation provided from a constant-amplitude source (not shown). A radiation receiver 11 has its input connected to antenna 10 and detects the power content in the carrier of the received signal to provide a direct-current output signal S.

A voltage divider 12, which is shown as a pair of resistors 13 and 14, is connected serially between the output of receiver 11 and ground. Divider 12 has a tap point 16, which provides a resistance relationship of $X/Y$, wherein X is the resistance between tap point 16 and ground, and Y is the total resistance of the voltage divider. Thus, the voltage G provided at tap 16 is defined as follows:

$$G = \frac{X}{Y} S \qquad (3)$$

An amplitude comparator 17 has one input connected to a divider tap point 16.

A memory device, which is a capacitor 21, is connected between ground and the other input of amplitude comparator 17. A switch 22 is connected serially between capacitor 21 and the output of radiation receiver 11.

A second switch 23 is interlocked with switch 22.

A switch actuating means 24 provides simultaneous actuation for switches 22 and 23. Means 24 provides its actuation at any time within the limits of the memory components used in the system when the signal provided at the output of receiver 11 is above a minimum value.

Switch 22 normally connects memory device 21 to the output of receiver 11; and switch 22 is opened by actuation of means 24. The simultaneous closing of the other switch 23 by actuation of initial switching means 24 provides a transient which occurs at the time $t_a$. The opening of switch 22 leaves a voltage $S_a$ on capacitor 21 which is the value of output voltage S at time instant $t_a$, and may be designated as $S_a$.

A relay 26, which operates a switch 27 is actuated by the output of amplitude comparator 17. Comparator actuation occurs at time $t_b$ when tap-point voltage G increases to equal stored capacitor voltage $S_a$. At this instant $t_b$, receiver output S has an instantaneous value $S_b$ defined as follows:

$$S_b = S_a \frac{Y}{X} \qquad (4)$$

The closing of relay switch 27 provides a transient at time $t_b$.

The times $t_a$ and $t_b$ are relative to the time that the vehicle will reach the radiation source, which will occur at a time $t_0$. The ratio $t_b/t_a$ designates the fraction of the travel time that the vehicle has journeyed toward destination time $t_0$ since initial time $t_a$. This time ratio is dependent on the setting of voltage divider 12 as follows:

$$\frac{t_b}{t_a} = \sqrt{\frac{X}{Y}} \qquad (5)$$

A computer 28 receives switched inputs at times $t_a$ and $t_b$. Also, computer 28 has been preset to recognize the ratio of $t_b/t_a$, which is predetermined by the setting of potentiometer 12. Computer 28 can give an output indication at any time relative to the two input times $t_a$ and $t_b$. For example, computer 28 can give an output indication at destination time $t_0$, or computer 28 could give an output indication at any time $t_f$ before destination time $t_0$, wherein time $t_f$ is fixed with respect to time $t_0$.

Figure 2:
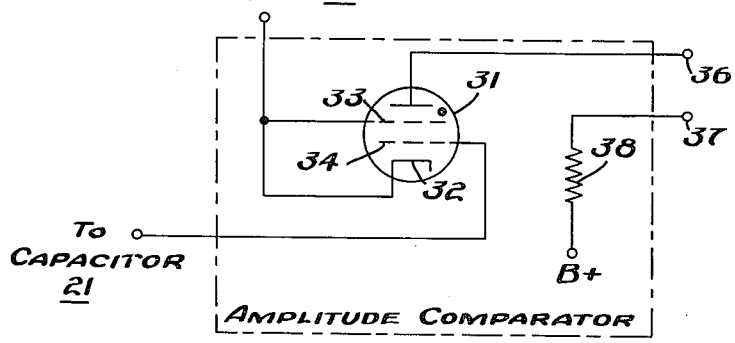
FIGURE 2 illustrates one type of amplitude comparator which may be used in the invention.

FIGURE 2 illustrates one type of amplitude comparator, which may be used with the invention. It includes a thyratron 31, which has its cathode 32 and grid 33 connected to divider tap point 16. Its other grid 34 is then connected to the ungrounded side of memory capacitor 21. Output terminals 36 and 37 are connected to relay 26, and a current-limiting resistor 38 is connected between the B-plus source and output terminal 37.

In some cases, relay 26 may be eliminated, and the second input to computer 28 may be directly connected to the output of amplitude comparator 17, because the transient actuation of thyratron 31 occurs at time $t_b$ and may be utilized as the second time input to computer 28.

Figure 3:
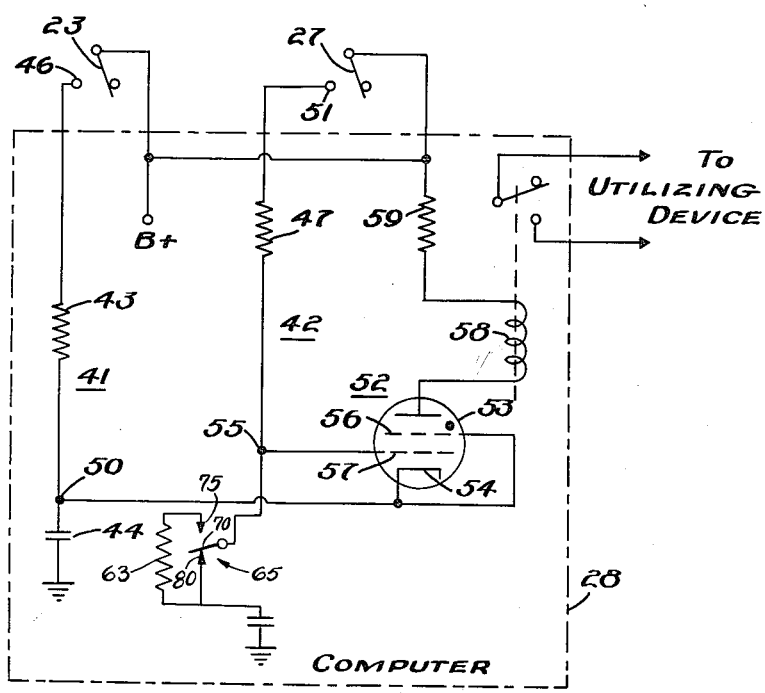
FIGURE 3 is an illustrative computer, which can be used with the invention.

One form of circuitry, which can be used for computer 28, is shown in FIGURE 3. It utilizes two charging circuits 41 and 42, each having preselected time constants, which will be defined below.

Charging circuit 41 comprises a resistor 43 and a capacitor 44 connected respectively in series between a contact 46 of switch 23 and ground. The pole of switch 23 is connected to the B-plus source.

Similarly, the other charging circuit 42 is comprised of a resistor 47 and a capacitor 48 respectively connected in series between the contact 51 of switch 27 and ground. The pole of switch 27 is also connected to the B-plus source.

The computer also includes an amplitude-comparing means 52, which is a thyratron 53 in FIGURE 3. The cathode 54 and one grid 56 of thyratron 53 are connected at point 50 to the ungrounded side of capacitor 44 in first charging circuit 41. The other grid 57 of thyratron 53 is connected at point 55 to the ungrounded side of capacitor 48 in second charging circuit 42. A relay 58 and a current-limiting resistor 59 are connected in series between the B-plus source and the plate of thyratron 53. The contacts of relay 58 are connected serially with a utilizing or indicating device (not shown), which uses the output indication of the computer, that is provided by switching of relay 58 at the required time $t_o$.

First charging circuit 41 has a longer time constant than second charging circuit 42, and the ratio of their time constants are related to the input times $t_a$ and $t_b$ and the voltage-divider setting as follows:

$$\frac{t_b}{t_a} = \frac{R_b C_b}{R_a C_a} = \sqrt{\frac{X}{Y}} \tag{6}$$

$R_a$ and $C_a$ are the respective resistance and capacitance of first charging circuit 41, and $R_b$ and $C_b$ are the respective resistance and capacitance of second charging circuit 42.

Computer 28 operates as follows: At instant $t_a$ first switch 23 is closed to connect charging circuit 41 to the B-plus source. Capacitor 44 then charges in the manner illustrated by curve 61 in FIGURE 4.

At later time $t_b$, second switch 27 is closed by operation of amplitude comparator 17 to connect second charging circuit 42 to the B-plus source. Capacitor 48 accordingly charges in the manner illustrated by curve 62 shown in FIGURE 4.

An output indication of computer 28 occurs when equality is obtained between the voltages on the respective charging capacitors 44 and 48. Amplitude comparator 52 senses this equality and provides a time indication at this instant by actuating relay 58. This instant of equality is provided at time $t_o$ by the cross-over of the charging characteristics 61 and 62 in FIGURE 4, because of the choice of the time-constant ratio according to Expression 6 above.

The output indication of computer 28 can be made to occur at a fixed time $t_f$ before destination time $t_o$ by the use of a switch 65 which has a movable contact 70 connected to point 55 and a pair of switch contacts 75 and 80 engageable by the movable contact 70. Contact 80 is connected to the condenser 48 and contact 75 is connected to one side of a resistor 63 which has its other side connected to the ungrounded side of condenser 48. By moving switch contact 70 between contacts 75 and 80 the resistor 63 may be placed in series with the charging circuit or removed as desired. This may be done by adding another resistor 63 serially in charging circuit 42 adjacent to capacitor 48.

The time-constant ratio of charging circuits 41 and 42 in the modified case is still defined by Expression 6 above.

However, the input to comparator 52 provided at point 55 is now across both resistor 63 and capacitor 48. As a result, at the closing of switch 27 at time instant $t_b$, the voltage at point 55 will have an initial value Q (shown in FIGURE 3), determined by the voltage-divider relationship of resistors 47 and 63. Thus, the initial voltage Q is defined as follows:

$$Q = \frac{R_{63}}{R_{47} + R_{63}} E_B \tag{7}$$

where $R_{47}$ is the resistance of resistor 47, and $R_{63}$ is the resistance of resistor 63, and $E_B$ is the supply voltage. The voltage at point 55 will hence charge in a manner represented by dotted curve 66 in FIGURE 3. Curve 66 will become equal in amplitude to initial charging curve 61 at time $t_f$ which occurs before time $t_o$ by a fixed amount dependent on the value of resistor 63.

In the modified form of the computer, the time constant $R_b C_b$ of circuit 42 may be the same as in the unmodified form for a given ratio of $t_a/t_b$. Accordingly, in the modified form, resistor 63 may be inserted by making the resistance of resistor 47 smaller by the same amount. Resistance $R_{63}$ is defined in the particular modified computer of FIGURE 3 as:

$$R_{63} = R_b \left( e^{\frac{-t_f}{R_b C_b}} - 1 \right) \tag{8}$$

Consequently, $$R_{47} = R_b - R_{63} \tag{9}$$

Types of computers are known, other than the computer of FIGURE 3, which will serve as computer 28 in the invention.

In the basic operation of the invention, initial time $t_a$ may occur at any time while the vehicle is moving toward the radiation source at a constant velocity, regardless of the distance of the invention from the source. The output S of receiver 11 varies with the travel time, $t$, according to Expression 1 above.

Accordingly, at two different times, $t_a$ and $t_b$, the received instant power $S_a$ and $S_b$, respectively, will be related as given by Expression 2 above.

Then, amplitude comparator 17 will provide an output at time, $t_b$, to indicate that, since time, $t_a$, the vehicle has moved a known fraction ($\sqrt{X/Y}$) of the travel time toward the source. The known fraction of time is determined by the resistance proportions of voltage divider 12 as defined by Expression 5 above.

For example, if the divider ratio $X/Y$ is 1/4, the time ratio $t_b/t_a$ will be 1/2. Thus, in this example, time, $t_a$, is twice time, $t_b$. In other words, the time indication for $t_b$ occurs when the vehicle has travelled ½ way to the source from initial time, $t_a$; and the vehicle will reach the destination at time, $t_o$, that will occur when the vehicle has travelled twice the time difference $(t_a - t_b)$ from time $t_a$. Computer 28 provides this time computation and indication.

FIGURE 5 shows an embodiment of the invention having a particular type of initial-switching means 24, which monitors the travel time in a manner that is less accurate than the present invention. The particular type of actuating means 24a in FIGURE 5 is described and claimed in a patent application Serial Number 606,947, mentioned above.

The component parts in FIGURE 5, which are like those shown in FIGURE 1, are given like reference numbers.

Actuating means 24a in FIGURE 5 includes a memory device, which is shown as a capacitor 71 that has one end connected to ground. A vibratory switch 72 is connected in series between the other end of capacitor 71 and the output of receiver 11. A pulser 73, which may be a multivibrator, operates a relay 74 to vibrate switch 72. A voltage divider 76 in actuating means 24 comprises resistors 77 and 78 which are connected in series between ground and the output of receiver 11.

An amplitude comparator 81 has two inputs. One input 82 is connected across memory capacitor 71. Another input 83 is connected to the tap point 79 of divider 76. Accordingly, divider tap 79 provides a voltage V that is a fixed fractional value of received signal S. This may be restated mathematically as:

$$V = \frac{1}{\beta} S \tag{10}$$

The constant $\beta$ is an important value in making a coarse-time determination device of this type.

Comparator input 82 receives a stepped voltage, $F_s$, due to capacitor 71 being periodically charged by the vibration of switch 72, which should be closed only a very short interval of each period of vibration. Amplitude comparator 81 provides an output actuation when the fractional input V, provided from divider tap point 79, equals the amplitude of stepped-voltage function $F_s$, provided from capacitor 71. The instant $t_1'$ of amplitude equality for input functions V and $F_s$ will be indicated by actuation of a relay 86 connected to the output of comparator 81. Relay 86 closes initial switch 23 to provide the first input to computer 28 at time $t_a$. Means 24 in FIGURE 5 can therefore begin operation of the present invention at a time, $t_a$, that is relatively close to time, $t_o$, so that memory capacitor 21 does not have to hold a charge for a long period and so that comparator 17 can have a relatively large input signal level.

FIGURE 6 illustrates the operation of actuating means 24 in FIGURE 5. FIGURE 6 shows illustrative functions for receiver output voltage, S, fractional signal output, V, provided at divider tap point 79, and stepped function $F_s$. The steps of function $F_s$ will each have the vibration period, A, of switch 72, which is determined by the operation of pulser 72.

The actual time indication $t_1'$ provided by switching means 24 in FIGURE 5, will generally have an error occurring within the following range:

$$t_1' = t_1 \text{ to } t_1\left(1 - \sqrt{\frac{1}{\beta}}\right) \quad (11)$$

wherein $t_1$ is the theoretical travel time at which an indication is desired, and $\beta$ will be defined as follows:

$$\beta = \frac{(t_1 + A)^2}{(t_1)^2} \quad (12)$$

Where the constant velocity of the vehicle is known, the invention may be used to indicate instantaneous distance to the radiation source, since time multiplied by a constant velocity provides distance.

It is understood that the constant-velocity herein referred to is the closure velocity between the radiation receiver and the radiation source. Therefore, the invention may be used where both the receiver and the source are moving or where the source is moving and the receiver is fixed.

While particular forms of the invention have been shown and described, it is to be understood that the invention is capable of many modifications. Changes, therefore, in construction and arrangement may be made without departing from the scope of the invention as given by the appended claims.

What is claimed is:

1. Means for indicating a predetermined travel time for a substantially constant average-energy vehicle moving toward a radiation source at a constant velocity, including means for receiving and detecting the amplitude of the radiation from said source, memory means for remembering a given voltage level, switching means connected between said memory means and the output of said receiving means, with said switching means being normally closed, voltage dividing means connected with the output of said receiving means, amplitude-comparator means having a pair of inputs, with one input connected to said memory means, and with its other input connected to a tap point on said voltage divider, computing means for providing an output indication at a time related to a pair of time-spaced switched inputs, means for providing the first switched input to said computing means simultaneously with the opening of said switching means, and means for providing an output indication of said comparator means to said computing means, with said comparator means providing as its output the second switched input to said computing means at substantially the instant that the inputs to said comparator means have a predetermined amplitude relationship.

2. Means for indicating a predetermined travel time for a vehicle moving toward a substantially constant average energy radiation source at a constant velocity, comprising radiation receiving means supported by said vehicle for sensing the amplitude of radiation received from said source, memory means for remembering a given electrical level, switching means connected between said memory means and the output of said radiation receiving means, voltage-dividing means connected to the output of said radiation receiving means, amplitude comparing means for providing an output signal when its inputs have a predetermined amplitude relationship, with one comparator means input connected across a portion of said voltage-dividing means, and its other input connected to said memory means, time computer means providing a switched output and having first and second inputs, with said first input connected to said switching means, means for actuating said switching means at a given travel time from said source, and said second input of said computer means being actuated by the output of said amplitude comparator means.

3. Means for indicating a predetermined closure time for a substantially constant energy radiation source and a radiation receiving means moving toward each other at a substantially constant velocity, comprising memory means for remembering a given electrical output of said receiving means, first switching means connecting said memory means to the output of said receiving means, a voltage dividing means connected to the output of said receiving means, said dividing means being set to a known fractional value, amplitude-comparing means having one input connected to said memory means and having another input connected to said voltage-dividing means, said comparator means providing an output signal when its inputs have a predetermined amplitude relationship, time computer means for providing an output signal at a time instant related to the timing of input signals provided to it, means for actuating said first switching means to disconnect said memory means from the output of said receiving means and to provide a first input signal to said computer at said first time instant, means connecting the output of said comparator means to said computer means for providing a second input signal to said computer means, said computer providing an output signal at a time instant that is related by a ratio to said first and second time instances with the fractional setting of said voltage-dividing means determining the ratio relationship between time instances of inputs to said computing means in relation to the instant a destination may be reached at the occurrence of said computer output signal.

4. Means for providing an output signal at a predetermined travel time for a substantially constant-energy radiation source and a radiation receiving means moving together at a substantially constant velocity, comprising a voltage divider connected to the output of said radiation means, a capacitor having one end connected to ground, an amplitude comparator having a pair of high impedance inputs, with one of its inputs connected to the tap of said voltage divided, and the other of its inputs connected to the ungrounded side of its capacitor, normally-closed switching means connected between the ungrounded side of said capacitor and the output of said radiation receiving means, computing means for providing an output signal at an instant determined by the timing of its inputs and by the fractional setting of said voltage divider, means for providing a first input to said computer in synchronism with an opening of said switching means, and means providing an output of said comparator to said computer at a second instant, with said computer providing said output signal at an instant having a particular time ratio to said first and second time instances.

5. Means for indicating a predetermined travel time for radiation-receiving means and a substantially constant-energy radiation source moving together at a substantially-constant velocity, comprising a voltage divider connected to the output of said receiving means, amplitude comparator means having a pair of inputs, said comparator means providing an output signal at a time instant when its inputs have a predetermined amplitude relationship, with one input connected across a portion of said voltage divider, a capacitor connected across the second input of said amplitude comparator means, switching means normally connecting said capacitor and said receiving means output to enable charging of said capacitor in proportion to the output of said receiving means, a time computer providing an output signal at a time having a preset ratio to first and second time instances, actuating means for simultaneously providing a first computer input at said first time instant and for opening said switching means, wherein said capacitor remembers the last voltage level it received from said receiver means output, and said comparator means output being provided to said computer means at said second time instant according to the voltage proportions of said voltage divider.

6. Means for indicating a predetermined travel time for radiation receiving means and a substantially constant-energy radiation source relatively moving together at a substantially constant velocity comprising a resistive voltage divider connected to the output of said receiving means, with said receiving means having square-law detection, amplitude-comparator means having one input connected across a portion of said voltage divider, a capacitor connected across the other input to said amplitude-comparator means, a first switching means connected between said capacitor and the output of said receiving means to permit said capacitor to be charged by said receiving means, computer means having a pair of inputs, second switching means ganged with said first switching means and connected serially with said first computer input, a third switching means actuated by said comparator output and connected serially to the second input of said computer means, with said computer means providing an output signal at a time that is related to the time of said computer inputs, with said computer input times being related to said computer output time by the square root of the voltage ratio obtained from said voltage divider.

7. A system as in claim 6 in which said computer comprises a first charging circuit having a first time constant, a second charging circuit having a second time constant, with said time constants having a ratio that is equal to the square root of said voltage divider ratio, means for initiating the charging of said first charging circuit in response to said second switching means, second means for initiating the charging of said second charging circuit in response to the output of said amplitude comparator means, and second amplitude-comparator means connected between intermediate points on said charging circuits to provide an output indication when a predetermined amplitude relationship occurs between its inputs, with the output indication of said second amplitude comparison means providing the output of said computer.

8. A system as in claim 6 in which said computer comprises a first charging circuit including a first resistor connected with a first capacitor, a second charging circuit comprising a second capacitor connected with second and third resistors, said first charging circuit connected with said second switching means, with a B-plus source connected to the other side of said second switching means and to one side of said third switching means, with said second charging circuit connected to the other side of said third switching means, amplitude comparing means having one input connected across the capacitor of said first charging circuit, and having its second input connected across the capacitor and one resistor of said second charging circuit, and means operated by said amplitude-comparing means when its inputs reach a predetermined amplitude relationship to provide the output of said computer.

9. Means for indicating a predetermined travel time between a radiation receiver and a substantially constant-energy radiation source moving together at a substantially constant velocity, with antenna means connected to the input to said radiation receiver, a resistive voltage divider connected between ground and the output of said radiation receiver, an amplitude comparator having one input connected to a tap point on said voltage divider, a capacitor having one end connected to ground and having its other end connected to the second input of said amplitude comparator, a first switch connected in series between said capacitor and the output of said radiation receiver, a time computer, actuating means for opening said first switch and providing a first computer input at a first time instant, an output signal of said comparator being provided to said computer at a second time instant to provide a second computer input, whereby said computer provides an output signal at an instant that is related to the time-ratio between its two inputs.

10. A system as defined in claim 9 wherein said actuating means comprises a second voltage divider connected between ground and the output of said radiation receiver, a second amplitude comparator having one input connected across a portion of said second voltage divider, a second capacitor connected across the second input of said second amplitude comparator, vibratory switching means connected serially between said second capacitor and the output of said radiation receiver, pulser means for periodically opening and closing said vibratory switching means, and means for providing an output indication of said second amplitude comparator to said computer to provide said first computer input when the second comparator inputs have a predetermined amplitude relationship.

11. A system as in claim 10 in which the computer includes first and second charging circuits, with switching means for connecting said first charging circuit to a D.C. voltage source upon actuation of the output of said initial switching means, other switching means for connecting said second charging circuit to said D.C. voltage source upon actuation of said first amplitude comparator, third amplitude comparator means connected between points on said charging circuit, with the output of said computer provided by the output of said third comparator means when its inputs have a predetermined amplitude relationship, and the time constants of said first and second charging circuits being related to the setting of said first voltage divider.

References Cited in the file of this patent
UNITED STATES PATENTS

| | | |
|---|---|---|
| 1,002,141 | Fessenden | Aug. 29, 1911 |
| 2,206,036 | Herson | July 2, 1940 |